United States Patent [19]
Dehaene

[11] Patent Number: 5,197,799
[45] Date of Patent: Mar. 30, 1993

[54] HEADLAMP HAVING BEAM ORIENTATION ADJUSTING MEANS

[75] Inventor: Guy Dehaene, Bagnolet, France

[73] Assignee: Valeo Vision, Bobigny Cedex, France

[21] Appl. No.: 732,068

[22] Filed: Jul. 18, 1991

[30] Foreign Application Priority Data

Jul. 23, 1990 [FR] France .................. 90 09373

[51] Int. Cl.⁵ .............................................. B60Q 1/06
[52] U.S. Cl. ....................................... 362/420; 362/66; 362/284; 362/289; 362/428
[58] Field of Search ................. 362/66, 273, 282, 284, 362/289, 418, 420, 421, 427, 428

[56] References Cited

U.S. PATENT DOCUMENTS

| 4,574,334 | 3/1986 | Igura | 362/273 |
| 4,731,706 | 3/1988 | Ricard | 362/61 |

FOREIGN PATENT DOCUMENTS

| 348707 | 2/1922 | Fed. Rep. of Germany. | |
| 3028700A-1 | 2/1982 | Fed. Rep. of Germany. | |
| 3710483 | 10/1988 | Fed. Rep. of Germany | 362/66 |
| 1444242 | 5/1966 | France. | |
| 2319512 | 7/1975 | France. | |
| 2488198 | 2/1982 | France | 362/66 |
| 2566721 | 7/1984 | France. | |
| 3437198 | 8/1985 | Italy | 362/66 |
| 0298551 | 1/1989 | Italy | 362/66 |
| 0206744 | 10/1985 | Japan | 362/66 |
| 1560702 | 7/1976 | United Kingdom. | |

Primary Examiner—Ira S. Lazarus
Assistant Examiner—Y. Quach
Attorney, Agent, or Firm—McCormick, Paulding & Huber

[57] ABSTRACT

A motor vehicle headlamp has adjusting means for adjusting the orientation of its reflector by essentially linear displacement of an application point on the reflector. This application point is defined by one end of a threaded rod which includes at its opposite end an adjusting head, and which is threadedly mounted with a first degree of friction in a fixed part of the headlamp. The threaded rod is also threadedly engaged, but with a second degree of friction, in an adjusting cap. The second degree of friction is greater than the first degree of friction.

7 Claims, 1 Drawing Sheet

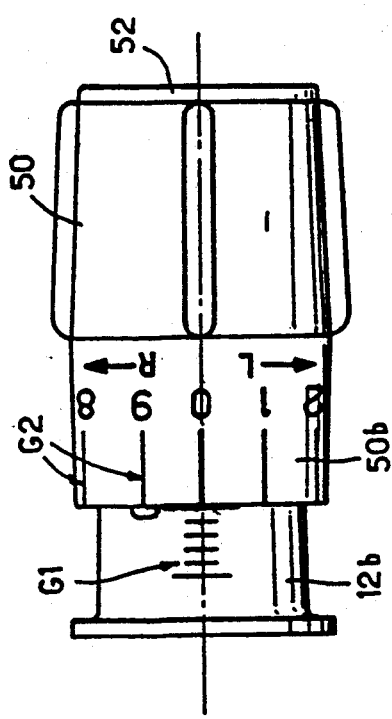
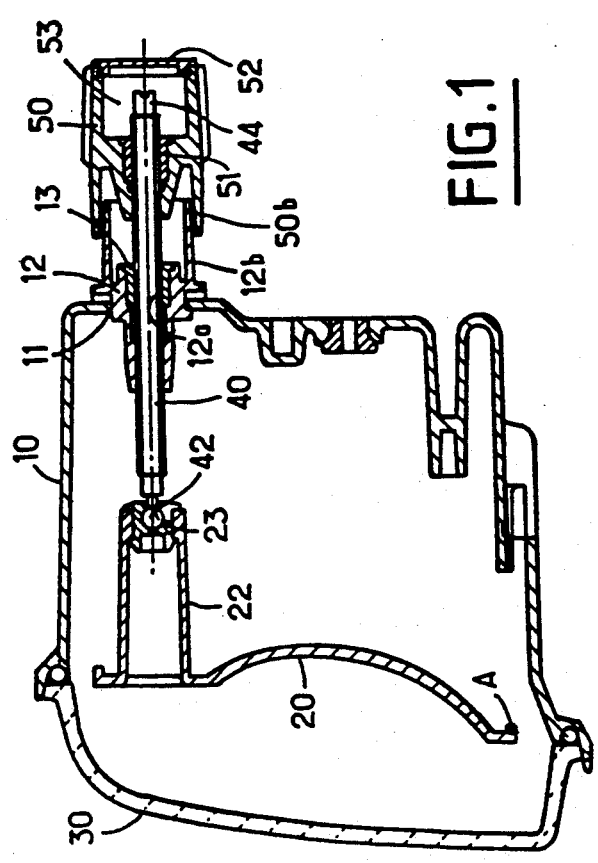
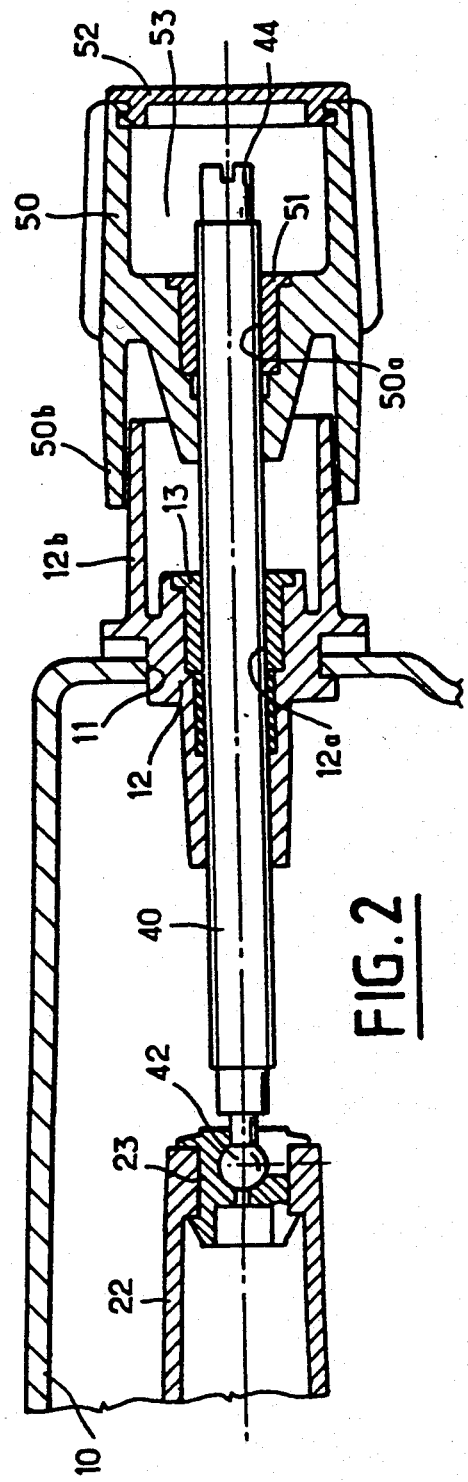

5,197,799

HEADLAMP HAVING BEAM ORIENTATION ADJUSTING MEANS

FIELD OF THE INVENTION

The present invention relates generally to headlamps for motor vehicles, of the kind having means for adjusting the orientation of the beam horizontally and/or vertically.

DISCUSSION OF THE INVENTION

The invention is more particularly directed to an improved device which enables the beam orientation to be pre-adjusted (i.e. adjusted in a preliminary adjustment in the factory), and then subsequently, if necessary, to be readjusted within a predetermined range with respect to the factory pre-adjustment, without involving any modification of the pre-adjustment, that is to say retaining, as it were, a "memory" of the pre-adjusted position.

According to the invention in a first aspect, a headlamp for a motor vehicle, of the kind comprising adjusting means for adjusting the orientation of a reflector by substantially linear displacement of an application point of the said reflector, is characterised in that the application point is defined by one end of a threaded rod which includes at its other end an adjusting head, the threaded rod being threadedly engaged with a first degree of friction in a fixed part of the headlamp, and being further threadedly engaged with a second degree of friction in an adjusting cap, the second degree of friction being greater than the first degree of friction.

Preferably, the adjusting cap includes a removable cover which closes a cavity in the cap, in which the adjusting head of the threaded rod is located.

The adjusting cap and the fixed part preferably have graduated scales defining a datum or pre-adjusted position, for example a central position.

The adjustment performed by the orientation adjusting means according to the invention is preferably azimuth adjustment.

According to the invention in a second aspect, a method of adjusting orientation of a headlamp of the kind defined above is characterised in that it includes the steps of:

holding the adjusting cap in a datum position defined by the scales, and simultaneously causing the threaded rod to rotate by rotating its adjusting head to a desired datum or pre-adjusted position, and subsequently, if necessary, performing an adjustment away from the datum position by rotation of the adjusting head.

In a variant, the method of adjustment includes the steps of:

causing the threaded rod to rotate by rotating its adjusting head to a desired datum or pre-adjusted position, with the adjusting cap being free to rotate with the threaded rod, using the adjusting head to prevent rotation of the threaded rod while rotating the adjusting cap to a base or reference position defined by the scales, and subsequently, if necessary, carrying out an adjustment from the base position by rotating the adjusting head.

Further aspects, objects and advantages of the present invention will appear more clearly from a reading of the detailed description that follows, in which a preferred embodiment of the invention is described, but by way of example only and with reference to the accompanying drawings.

BRIEF DESCRIPTION OF THE DRAWINGS

FIG. 1 is an assembly drawing, in horizontal cross section, of a headlamp equipped with adjusting means in accordance with the invention.

FIG. 2 is a detail view on a larger scale, of part of FIG. 1.

FIG. 3 is a top plan detail view on part of FIG. 2.

DESCRIPTION OF A PREFERRED EMBODIMENT OF THE INVENTION

Referring first of all to FIG. 1, this shows a headlamp which comprises a housing 10 enclosing a reflector 20 and a lamp (not shown), the front of the housing being closed by a lens 30. The beam emitted by this headlamp may be adjusted in the horizontal direction (i.e. in azimuth), and to this end the reflector is mounted pivotally about a lateral end around a vertical axis indicated by the reference A. The axis A is that of a pivot carried by the housing 10. The other lateral end of the reflector 20 is displaceable in one direction, for example a direction parallel to the optical axis, in order to effect the desired adjustment.

It should be noted that suitable means (not shown) could also be provided for effecting the all-round adjustment of the beam, in which case the pivot A may take the form of appropriate ball-type mountings or the like, acting as points for pivoting attachment for both types of adjustment.

FIG. 2 is a detail view of the means for displacing the lateral end of the reflector from front to rear and vice versa, in order to carry out the azimuth adjustment. The reflector 20 has a rearward extension 22, which is for example formed by moulding, with a spherical dowel 23 secured at its free end, in this example by being resiliently clipped in position. A threaded rod 40 includes at its anterior end (i.e. the left hand end as seen in FIG. 2) a spherical head 42, which constitutes a point of engagement for the reflector, and which is fitted in the dowel 23 to give a coupling of the ball and socket type, which enables the rod 40 and the reflector 20 to adopt inclinations with respect to each other that are adjustable by pivoting of the reflector around the pivot point A. The rod 40 has an adjusting head 44 at its rear end, to enable it to be rotated by means of a screwdriver.

The rod 40 is threaded into a threaded central bore 12a of a member 12 that is secured within a hole 11 formed in the rear wall of the housing 10. In this example, the bore 12a is formed in an insert 13, which may be of metal and which is secured in the member 12. Rotation of the rod 40 causes its head 42 to become displaced along the axis of the rod 40 with respect to the housing 10, thus adjusting the beam produced by the reflector as regards its azimuth setting.

An adjusting cap 50, which may for example be generally cylindrical, has a threaded bore 50a in which the threaded rod 40 is engaged with a predetermined amount of friction, as will be seen below. As shown, the threaded bore 50a is defined in this example in an insert or bush 51 which is secured to the cap 50. The cap 50 has a removable cover 52, which when it is removed exposes a cavity 53, into which the rod 40 projects so that its adjusting head 44 lies within the cavity 53. In addition, the cap 50 has a generally cylindrical skirt 50b which extends forwardly, while the member 12 secured to the housing 10 includes a skirt 12b which extends rearwardly and penetrates a short way into the interior of the skirt 50b.

As can be seen from FIG. 3, the skirts 12b and 50b carry graduated scales. In this example, the skirt 12b has a scale with transverse graduations G1, the interval between which is for example equal to the pitch of the thread on the threaded rod 40. The indication is given by the position of the free front terminal edge of the skirt 50b with respect to the scale G1. The latter is of course extended, towards the right as seen in FIG. 3, i.e. within the skirt 50b and therefore not visible in the Figure. The skirt 50b carries a second scale having graduations G2 parallel to its axis, for example ten numbered graduations which are disposed at equal spacings around the skirt. The adjusting cap 50, in cooperation with the fixed member 12, thus defines a micrometer screw-type adjusting means. In the present example, the scales G1 and G2 define a base or reference position that is central. It is of course possible to provide a non-central base position, for example at one of the ends of the course of travel.

The coupling torque between the adjusting cap 50 and the threaded rod 40, which is determined by the friction existing between the rod 40 and the insert 51, is chosen so as to be markedly greater than the coupling torque between the rod 40 and the housing 10, which is determined by the friction between the rod 40 and the insert 13. The reason for this will be explained later herein.

The adjusting means can be operated in the following way. Azimuth adjustment of the beam is first of all carried out in the factory by rotating the threaded rod 40 using a screwdriver, the cover 52 having been removed beforehand, with the adjusting cap 50 being restrained from movement by any appropriate means in its central position (i.e. the position seen in FIG. 3, in which both of the scales G1 and G2 indicate zero). The screwdriver is used to exert a torque which is sufficient to overcome the friction of the threaded rod 40, both in the threaded bore 12a and in the other threaded bore 50a. The cover 52 is then replaced, and this preliminary adjustment is then complete.

Subsequently, the user or a maintenance mechanic can operate the adjusting cap 50 so as to carry out fine adjustment in either direction of the zero or datum position which has been determined by the preliminary adjustment. Given the existence, between the adjusting cap 50 and the threaded rod 40, of a degree of friction which is greater than that existing between the threaded rod 40 and the fixed member 12, the adjusting cap 50 rotates the rod 40 without any angular displacement taking place between these two components.

It should be noted that the preliminary adjustment may be carried out in a different way. For instance, the rod 40 may first be rotated using a screwdriver, without the adjusting cap 50 being prevented from rotating. In consequence, the latter rotates with the threaded rod 40. Once the preliminary adjustment has been effected, the threaded rod 40 is then restrained from further rotation, again using the screwdriver, while the adjusting cap 50 is rotated to its zero position as shown in FIG. 3. The adjusting device described above is particularly simple and practical for combining, in a single device, a factory pre-adjusting operation and subsequent adjustment, the latter being obtained by variations about a given central point which is determined during the preliminary adjustment.

The present invention is of course not limited to the embodiment described above and shown in the drawings: the ordinary person skilled in the art will be able to apply to it any variant or modification within the scope of the invention. In particular, the preliminary and running adjusting means may be used in a headlamp for azimuth adjustment and/or for all-round adjustment. However, in a preferred embodiment, azimuth pre-adjustment and running adjustment are provided, while separate means are provided for performing all-round adjustment associated with an all-round absolute beam inclination indicating device.

What is claimed is:

1. A motor vehicle headlamp comprising a fixed part, a reflector defining an application point of the reflector, means mounting the reflector in a fixed position with respect to the said fixed part, for substantially linear movement of the said application point with respect to the fixed part, and adjusting means for adjusting the orientation of the reflector with respect to the fixed part, the adjusting means comprising a threaded rod mounted in the said fixed part with a first degree of friction, the threaded rod having a first end coupled with the reflector at the said application point and a second end having an adjusting head, and an adjusting cap, the threaded rod being threadedly engaged in the adjusting cap with a second degree of friction greater than the said first degree of friction.

2. A motor vehicle headlamp according to claim 1, wherein the adjusting cap and the said fixed part carry graduated scales defining an adjusting position.

3. A motor vehicle headlamp according to claim 2, wherein the adjusting cap is hollow to define a cavity within it, and further comprises a removable cover closing the said cavity, the said threaded rod extending into the cavity with its adjusting head lying within the cavity.

4. A motor vehicle headlamp according to claim 2, wherein the orientation adjusting means perform azimuth adjustment of the light beam emitted by the reflector.

5. A headlamp according to claim 3 wherein the orientation adjusting means perform azimuth adjustment of the light beam emitted by the reflector.

6. A method of adjusting the orientation in a motor vehicle headlamp comprising a fixed part, a reflector defining an application point of the reflector, means mounting the reflector in a fixed position with respect to the said fixed part, for substantially linear movement of the said application point with respect to the fixed part, and adjusting means for adjusting the orientation of the reflector with respect to the fixed part, the adjusting means comprising a threaded rod mounted in the said fixed part with a first degree of friction, the threaded rod having a first end coupled with the reflector at the said application point and a second end having an adjusting head, and an adjusting cap and fixed part carrying graduated scales defining an adjusting position, the threaded rod being threadedly engaged in the adjusting cap with a second degree of friction greater that the said first degree of friction, said method comprising the steps of:

holding the adjusting cap in a datum position defined by the said graduated scales, and simultaneously causing the threaded rod to rotate by rotating its adjusting head into a desired preliminary adjustment position, and subsequently, if necessary, carrying out an adjustment from the datum position by actuating the adjusting cap.

7. A method of adjusting the orientation of a motor vehicle headlamp comprising a fixed part, a reflector defining an application point of the reflector, means mounting the reflector in a fixed position with respect to the said fixed part, for substantially linear movement of the said application point with respect to the fixed part, and adjusting means for adjusting the orientation of the reflector with respect to the fixed part, the adjusting means comprising a threaded rod mounted in the said fixed part with a first degree of friction, the threaded rod having a first end coupled with the reflector at the said application point and a second end having an adjusting head and an adjusting cap and fixed part carrying graduated scales defining an adjusting position, the threaded rod being threadedly engaged in the adjusting cap with a second degree of friction greater than the said first degree of friction, said method comprising the steps of:

rotating the threaded rod by rotation of its adjusting head into a desired preliminary adjustment position, the adjusting cap being free to rotate with the threaded rod;

preventing the threaded rod from rotating by restraining its adjusting head, and simultaneously causing the adjusting cap to move to a datum position defined by the graduated scales, and subsequently, if necessary, carrying out an adjustment from the datum position by operating the adjusting cap.

* * * * *